(12) United States Patent
Han et al.

(10) Patent No.: US 10,788,861 B2
(45) Date of Patent: Sep. 29, 2020

(54) FLEXIBLE DISPLAY DEVICE AND DEFORMATION COMPENSATION METHOD OF FLEXIBLE DISPLAY SCREEN

(71) Applicant: Wuhan China Star Optoelectronics Technology Co., Ltd., Wuhan, Hubei (CN)

(72) Inventors: Wen Han, Guangdong (CN); Rong Ma, Guangdong (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 53 days.

(21) Appl. No.: 16/208,500

(22) Filed: Dec. 3, 2018

(65) Prior Publication Data

US 2019/0302848 A1    Oct. 3, 2019

Related U.S. Application Data

(63) Continuation of application No. PCT/CN2018/101681, filed on Aug. 22, 2018.

(30) Foreign Application Priority Data

Mar. 28, 2018    (CN) .......................... 2018 1 0263912

(51) Int. Cl.
  *G09G 5/00*   (2006.01)
  *G06F 1/16*   (2006.01)
(52) U.S. Cl.
  CPC .......... *G06F 1/1652* (2013.01); *G06F 1/1641* (2013.01)
(58) Field of Classification Search
  CPC .............................. G06F 1/1652; G06F 1/1641

USPC ........................................................ 345/156
See application file for complete search history.

(56) References Cited

U.S. PATENT DOCUMENTS

| | | | |
|---|---|---|---|
| 9,164,547 B1 | 10/2015 | Kwon et al. | |
| 2012/0002360 A1* | 1/2012 | Seo | G06F 1/1616 361/679.01 |
| 2013/0010405 A1* | 1/2013 | Rothkopf | H04M 1/0216 361/679.01 |
| 2014/0085230 A1* | 3/2014 | Sato | G06F 1/1652 345/173 |
| 2014/0126133 A1* | 5/2014 | Griffin | G06F 1/1616 361/679.27 |
| 2014/0321074 A1 | 10/2014 | Chida et al. | |
| 2014/0380186 A1* | 12/2014 | Kim | G06F 1/1624 715/746 |
| 2015/0378397 A1* | 12/2015 | Park | G06F 1/1652 361/679.27 |

(Continued)

FOREIGN PATENT DOCUMENTS

| | | |
|---|---|---|
| CN | 105118386 A | 12/2015 |
| CN | 106328003 A | 1/2017 |
| CN | 107564423 A | 1/2018 |

*Primary Examiner* — Jonathan M Blancha

(57) ABSTRACT

A flexible display device and a deformation compensation method of a flexible display screen are provided. The flexible display device may include a display screen, a controller, motors respectively disposed on two sides of the flexible display screen, and force sensors respectively disposed on the two sides of the flexible display screen. The motors and the force sensors may be connected with the controller. The force sensors may be rigidly connected with the flexible display screen. The motors may be provided with stretchy screw rods rigidly connected with the flexible display screen.

17 Claims, 2 Drawing Sheets

(56) References Cited

U.S. PATENT DOCUMENTS

2016/0302316 A1\* 10/2016 Jeong .................... G05B 11/01
2018/0068594 A1   3/2018 Dong
2018/0267571 A1   9/2018 Chen et al.

\* cited by examiner

Force sensors are respectively connected to two sides of the flexible display screen, and motors are respectively connected to the two sides of the flexible display screen, wherein the motors are provided with stretchy screw rods rigidly connected with the flexible display screen ~S31

The force sensors and the motors are connected to a controller ~S32

The tension transmitted by the flexible display screen when the flexible display screen is switched between a planar state and a folded state is obtained by the force sensors, the transverse displacement of the flexible display screen is figured out by the controller according to the tension, and the motors are controlled to drive the flexible display screen to generate a displacement which is opposite to transverse displacement in direction and identical with the transverse displacement in distance ~S33

FIG. 3

FLEXIBLE DISPLAY DEVICE AND DEFORMATION COMPENSATION METHOD OF FLEXIBLE DISPLAY SCREEN

CROSS REFERENCE TO RELATED APPLICATIONS

The present application is a continuation-application of International (PCT) Patent Application No. PCT/CN2018/101681 field on Aug. 22, 2018, which claims foreign priority of Chinese Patent Application No. 201810263912.6, filed on Mar. 28, 2018, in the State Intellectual Property Office of China, the entire contents of which are hereby incorporated by reference.

TECHNICAL FIELD

This application relates to the technical field of flexible display, in particular to a flexible display device and a deformation compensation method of a flexible display screen.

BACKGROUND

With the development of the display technology, flexible display devices have become one of the mainstreams in the display field. As the flexible display screens of the flexible display devices can be freely folded, the flexible display devices are foldable. Tension will be generated when the flexible display devices are switched between a planar state and a folded state. Particularly, when the flexible display devices in the planar state are switched to the folded state, the tension is a pushing force towards two sides; and when the flexible display devices in the folded state are switched to the planar state, the tension is a pulling force towards a folding area. The tension concentrated in the folding area of the flexible display screens will result in a certain degree of deformation of the folding area of the flexible display screens, waving or warpage, and damage to internal components of the flexible display screens such as line breakage of TFT (Thin Film Transistor), consequentially, causing poor display.

SUMMARY

In view of this, this application provides a flexible display device and a deformation compensation method of a flexible display screen, which can compensate for a deformation generated by tension when the flexible display screen is switched between a planar state and a folded state, thus, making the tension borne by a folding area within a tolerable range.

In one embodiment of this application, the flexible display device comprises a flexible display screen, a controller, motors respectively disposed on two sides of the flexible display screen, a backboard carrying the flexible display screen, and force sensors respectively disposed on the two sides of the flexible display screen. The motors and the force sensors are connected with the controller. The force sensors are rigidly connected with a peripheral frame of the flexible display screen. The motors are provided with stretchy screw rods rigidly connected with the flexible display screen. The backboard comprises a first board body and a second board body. The first board body has an end provided with first extension parts extending towards the second board body. The first board body has an end provided with second extension parts extending towards the first board body. The first extension parts and the second extension parts are sequentially and alternately disposed in the longitudinal direction. When the flexible display screen is in the planar state, the orthographic projection of a folding area of the flexible display screen is located in the areas of the first extension parts and the second expansion parts. When the flexible display screen is in the planar state, the transverse distance between the first board body and the second board body is greater than or equal to the deformation of the folding area of the flexible display screen.

In one embodiment of this application, the flexible display device comprises a flexible display screen, a controller, motors respectively disposed on two sides of the flexible display screen, and force sensors respectively disposed on the two sides of the flexible display screen. The motors and the force sensors are connected with the controller. The force sensors are rigidly connected with the flexible display screen. The motors are provided with stretchy screw rods rigidly connected with the flexible display screen.

In one embodiment of this application, a deformation compensation method of a flexible display screen comprises the following steps:

respectively connecting force sensors to two sides of the flexible display screen, and respectively connecting motors to the two sides of the flexible display screen, wherein the motors are provided with stretchy screw rods rigidly connected with the flexible display screen;

connecting the force sensors and the motors with a controller; and obtaining, by the force sensors, the tension transmitted by the flexible display screen when the flexible display screen is switched between a planar state and a folded state, figuring out, by the controller, the transverse displacement of the flexible display screen according to the tension, and controlling the motors to drive the flexible display screen to generate a displacement which is opposite to the transverse displacement in direction and identical with the transverse displacement in distance.

This application has the following beneficial effects: the force sensors are respectively and rigidly connected to the two sides of the flexible display screen, and the motors are respectively connected to the two sides of the flexile display screen and are provided with the stretchy screw rods rigidly connected with the flexible display screen; when the flexible display screen is switched between the planar state and the folded state, the force sensors obtain the tension transmitted by the flexible display screen, and the controller figures out the transverse displacement of the flexible display screen according to the tension and then controls the motors to drive the flexible display screen to generate a displacement which is opposite to the transverse displacement in direction and identical with the transverse displacement in distance, so that the deformation generated by the tension when the flexible display screen is switched between the planar state and the folded state is compensated, and the tension borne by the folding area of the flexible display screen is made within a tolerable range.

BRIEF DESCRIPTION OF THE DRAWINGS

FIG. 3 is a flow diagram of a deformation compensation method of a flexible display screen in one embodiment of this application.

DETAILED DESCRIPTION

A clear and complete description of technical solutions provided by illustrative embodiments of this application is given below with reference to the accompanying drawings. The embodiments described below and technical characteristics of these embodiments can be combined without confliction. In addition, directional terms such as "upper" and "lower" in the whole text of this application are only used for a better description of the technical solutions of these illustrative embodiments and are not intended to limit the protection scope of this application.

Figure 1:
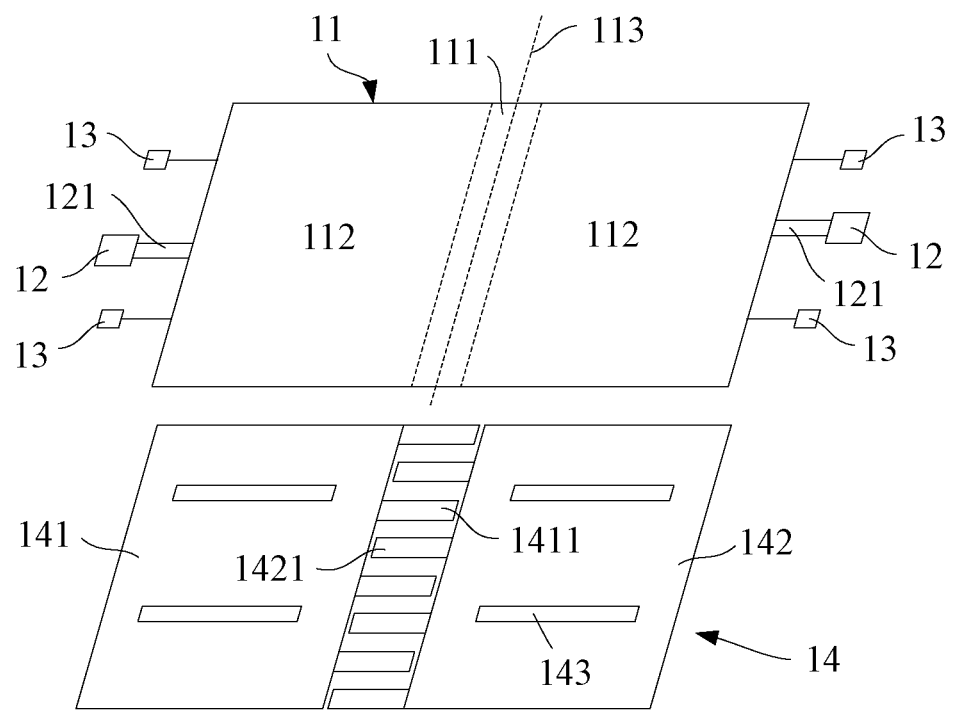
FIG. 1 is an exploded view of a flexible display device in one embodiment of this application.

FIG. 1 is a structural view of a flexible display device in the first embodiment of this application. As shown in FIG. 1, the flexible display device comprises a flexible display screen 11, a controller (not shown), motors 12 respectively disposed on two sides of the flexible display screen 11, and force sensors 13 respectively disposed on the two sides of the flexible display screen 11. The controller is electrically connected with the motors 12 and the force sensors 13. The force sensors 13 are rigidly connected with the flexible display screen 11. Particularly, the force sensors 13 can be rigidly connected with a peripheral frame of the flexible display screen 11. A screw rod 121 is disposed on a side, towards the flexible display screen 11, of each motor 12. The screw rods 121 are designed to be stretchy, which means that the extension length of the screw rods 121 can be adjusted by the motors 12. The screw rods 121 are rigidly connected with the flexible display screen 11.

The flexible display screen 11 comprises a folding area 111 and non-folding areas 112 located on two sides of the folding area 111. The folding area 111 can be folded with a folding axis 113 as the axis, so that the flexible display screen 11 in a planar state shown in FIG. 1 can be folded to be in a folded state shown in FIG. 2. Of course, the flexible display screen 11 in the folded state shown in FIG. 2 can also be switched to the planar state shown in FIG. 1. Wherein, the folding axis 113 can be a transverse bisector of the flexible display screen 11 or a transverse bisector of the folding area 111. Herein, when the flexible display screen 11 is in the planar state, the two non-folding areas 112 are symmetrically disposed along the folding axis 113, while when the flexible display screen 11 is in the folded state, the two non-folding areas 112 overlap with one above the other.

Figure 2:
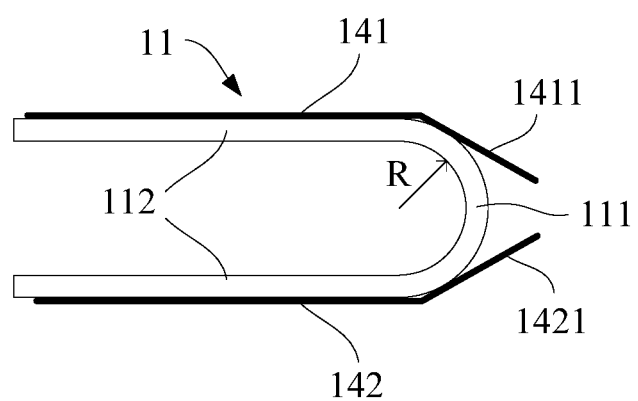
FIG. 2 is a structural view of the flexible display device in a folded state in FIG. 1.

After the flexible display screen 11 in the planar state shown in FIG. 1 is switched to the folded state shown in FIG. 2:

The folding area 111 bends and deforms, and the deformation is $\pi R$, wherein R is the radius of curvature of the folding area 111 when the flexible display screen 11 is in the folded state. At this moment, the left side and the right side of the folding area 111 respectively generate a first transverse displacement and a second transverse displacement; the first transverse displacement and the second transverse displacement are opposite in direction, specifically, the first transverse displacement is in a direction from the folding area 111 to the left side of the flexible display screen 11, while the second transverse displacement is in a direction from the folding area 111 to the right side of the flexible display screen 11; and the distance of the first transverse displacement and the distance of the second transverse displacement are equal and are both $(1/2*\pi R)$. Wherein, the distance x1 of the first transverse displacement is a leftward deformation of the folding area 111, and the distance x2 of the second transverse displacement is a rightward deformation quantity of the folding area 111. At the same time, the left side and the right side of the flexible display screen 11 are stretched outwards, the force sensors 13 on the left side detect a first pushing force, the force sensors 13 on the right side detect a second pushing force, and the first pushing force and the second pushing force are opposite in direction and identical in force value; and according to the Hooke's law relation $F=k*x$, the force value of the first pushing force is $F1=k*x1=(k/2*\pi R)$, and the force value of the second pushing force is $F2=k*x2=(k/2*\pi R)$, wherein k is the elastic coefficient of the flexible display screen 11.

The controller figures out a deformation required for the left side of the folding area 111 in terms of the first pushing force detected by the force sensors 13 on the left side according to the Hooke's law relation, and similarly, a deformation required for the right side of the folding area 111 can be figured out in terms of the second pushing force detected by the force sensors 13 on the right side. Afterwards, the controller generates a control instruction and sends the control instruction to the motors 12 on the left side and the right side, and the control instruction is used to instruct the motor 12 on the left side to drive the flexible display screen 11 to generate a third transverse displacement and to instruct the motor 12 on the right side to drive the flexible display screen 11 to generate a fourth transverse displacement, wherein the third transverse displacement and the first transverse displacement are opposite in direction and identical in distance, and the fourth transverse displacement and the second transverse displacement are opposite in direction and identical in distance.

The motors 12 located on the left side and the right side rotate in a preset direction (such as the clockwise direction) according to the control instruction so as to increase the extension length of the screw rods 121, wherein the screw rod 121 on the left side pushes the flexible display screen 11 to generate the third transverse displacement, and the screw rod 121 on the right side pushes the flexible display screen 11 to generate the fourth transverse displacement. A deformation generated by the third transverse displacement is used to compensate for a deformation generated by the first transverse displacement, and a deformation generated by the fourth transverse displacement is used to compensate for a deformation generated by the second transverse displacement. In this way, the flexible displace screen 11 does not deform on the whole, the tension borne by the flexible display screen 11 is zero according to the Hooke's law, the tension borne by the folding area 111 is within a tolerable range, and thus, waving of the flexible display screen 11 is avoided, and damage to internal components of the flexible display screen 11 is prevented.

After the flexible display screen 11 in the folded state shown in FIG. 2 is switched to the planar state shown in FIG. 1:

The folding area 111 stretches and deforms, and the deformation is $\pi R$, wherein the left side and the right side of the folding area 111 respectively generate a fifth transverse displacement and a six transverse displacement; the fifth transverse displacement and the six transverse displacement are opposite in direction, specifically, the fifth transverse displacement is in a direction from the left side of the flexible display screen 11 to the folding area 111, and the sixth transverse displacement is in a direction from the right side of the flexible display screen 11 to the folding area 111; and the distance of the fifth transverse displacement and the distance of the sixth transverse displacement are equal and are both $(1/2*\pi R)$. Wherein, the distance x5 of the fifth transverse displacement is the deformation of the left side of the folding area 111, and the distance x6 of the sixth transverse displacement is the deformation of the right side of the folding area 111. At the same time, the left side and the right side of the flexible display screen 11 are contracted inwards, the sensors 13 on the left side and the sensors 13 on the right side respectively detect a first pulling force and a second pulling force, the first pulling force and the second pulling force are opposite in direction and identical in force value, and according to the Hooke's law relation, the force value of the first pulling force is $F3=k*x5=(k/2*\pi R)$, and the force value of the second pulling force is $F4=k*x6=(k/2*\pi R)$.

The controller figures out a deformation required for the left side of the folding area 111 in terms of the first pulling force detected by the force sensors 13 on the left side according to the Hooke's law relation, and similarly, a deformation required for the right side of the folding area 111 is figured out in terms of the second pulling force detected by the force sensors 13 on the right side. Afterwards, the controller generates a control instruction and sends the control instruction to the motors 12 on the left side and the right side, and the control instruction is used to instruct the motor 12 on the left side to drive the flexible display screen 11 to generate a seventh transverse displacement and to instruct the motor 12 on the right side to drive the flexible display screen 11 to generate an eighth transverse displacement, wherein the seventh transverse displacement and the fifth transverse displacement are opposite in direction and identical in distance, and the eighth transverse displacement and the sixth transverse displacement are opposite in direction and identical in distance.

The motors 12 located on the left side and the right side rotate according to the control instruction so as to decrease the extension length of the screw rods 121, wherein the screw rod 121 on the left side pulls the flexible display screen 11 to generate the seventh transverse displacement, and the screw rod 121 on the right side pulls the flexible display screen 11 to generate the eighth transverse displacement. A deformation generated by the seventh transverse displacement is used to compensate for a deformation generated by the fifth transverse displacement, and a deformation generated by the eighth transverse displacement is used to compensate for a deformation generated by the sixth transverse displacement. In this way, the flexible display screen 11 does not deform on the whole, the tension borne by the flexible display screen 11 is zero according to the Hooke's law, the tension borne by the folding area 111 is within a tolerable range, and thus, warpage of the flexible display screen 11 is avoided, and damage to the internal components of the flexible display screen 11 is prevented.

Referring to FIG. 1 and FIG. 2 again, the flexible display device further comprises a backboard 14 used to carry the flexible display screen 11. The backboard 14 comprises a first board body 141 and a second board body 142, wherein the first board body 141 is used to carry the non-folding area 112 on the left side, and the second board body 142 is used to carry the non-folding area 112 on the right side. The first board body 141 has an end provided with first extension parts 1411 extending towards the second board body 142. The second board body 142 has an end provided with second extension parts 1421 extending towards the first board body 141. The first extension parts 1411 and the second extension parts 1421 are sequentially and alternately disposed in the longitudinal direction. When the flexible display screen 11 is in the planar state, the orthographic projection of the folding area 111 is located in the areas of the first extension parts and the second extension parts, and thus, the transverse distance between the first board body 141 and the second board body 142 is greater than or equal to $\pi R$ when the flexible display screen 11 is in the planar state.

After the flexible display screen 11 in the folded state shown in FIG. 2 is switched to the planar state shown in FIG. 1, the first board body 141 and the second board body 142 draw close to the folding area 111 so as to flatly support the folding area 111 from below, and thus, the flexible display screen 11 can be protected against a deformation caused by touch press when touch operation is executed on the flexible display screen 11.

After the flexible display screen 11 in the planar state shown in FIG. 1 is switched to the folded state shown in FIG. 2, the first extension parts 1411 and the second extension parts 1421 are tangent to the folding area 111, so that the folding area 111 is supported from below, the tension borne by the folding area 111 is partially transmitted to the first extension parts 1411 and the second extension parts 1421 and is prevented from being concentrated in the folding area 111, and thus, damage to the internal components of the flexible display screen 11 is further prevented.

In order to prevent an acting force transmitted to the flexible display screen 11 by the motors 12 against the influence of the friction force between the backboard 14 and the flexible display screen 11 to make sure that the flexible display screen 11 can deform as needed when the acting force is applied to the flexible display screen 11 by the motors 13, sliding mechanisms 143 can be respectively disposed on the first board body 141 and the second board body 142, and the flexible display screen 11 is carried by the sliding mechanisms 143. Wherein, the sliding mechanisms 143 can be, but not limited to, sliding guide rails, balls or the like.

When switched between the planar state and the folded state, the flexible display screen 11 deforms relative to the backboard 14. Specifically, in the process of switching the flexible display screen 11 in the planar state to the folded state, the motor 12 on the left side drives the flexible display screen 11 to generate the third transverse displacement relative to the first board body 141, and the motor 12 on the right side drives the flexible display screen 11 to generate the fourth transverse displacement relative to the second board body 142; and in the process of switching the flexible display screen 11 in the folded state to the planar state, the motor 12 on the left side drives the flexible display screen 11 to generate the seventh transverse displacement relative to the first board body 141, and the motor 12 on the right side drives the flexible display screen 11 to generate the eighth transverse displacement relative to the second board body 142.

In this process, the distance of the transverse displacement, relative to the first board body 141, of the non-folding area 112 on the left side is $(1/2*\pi R)$, the distance of the transverse displacement, relative to the second board body 142, of the non-folding area 112 on the right side is $(1/2*\pi R)$, and thus, the transverse dimension of the sliding mechanisms 143 located on the first board body 141 is at least $(1/2*\pi R)$, and the transverse dimension of the sliding mechanisms 143 located on the second board body 142 is at least $(1/2*\pi R)$.

Of course, as for the design that the backboard 14 is fixed relative to the flexible display screen 11, the sliding mechanisms 143 are disposed on the outer side of the first board body 141 and the outer side of the second board body 142 in this application, so that the backboard 14 and the flexible display screen 11 are driven by the motors 12 to move synchronously. The flexible display screen 11 moves relative to a rear shell of the flexible display device, so that the acting force applied to the flexible display screen 11 by the motors 12 is prevented against the influence of the friction force between the rear shell and the backboard 14 (the friction force between the rear shell and the flexible display screen 11), and thus, it is ensured that the flexible display screen 11 can deform as needed when the acting force is applied to the flexible display screen 11 by the motors 12.

It should be understood that as for the design that the backboard 14 is fixed relative to the flexible display screen 11, the force sensors 13 can be rigidly connected with the left side and the right side of the backboard 14, and similarly, the screw rods 121 can be rigidly connected with the left side and the right side of the backboard 14.

FIG. 3 is a flow diagram of a deformation compensation method of a flexible display screen in one embodiment of this application. As shown in FIG. 3, the deformation compensation method of the flexible display screen comprises steps S31-S33:

S31, Force sensors are respectively connected to two sides of the flexible display screen, and motors are respectively connected to the two sides of the flexible display screen, wherein the motors are provided with stretchy screw rods rigidly connected with the flexible display screen;

S32, The force sensors and the motors are connected to a controller; and

S33, The tension transmitted by the flexible display screen when the flexible display screen is switched between a planar state and a folded state is obtained by the force sensors, the transverse displacement of the flexible display screen is figured out by the controller according to the tension, and the motors are controlled to drive the flexible display screen to generate a displacement which is opposite to transverse displacement in direction and identical with the transverse displacement in distance.

Wherein, all structural components adopted by the deformation compensation method are the same as those in the above embodiment, and thus, the deformation compensation method also has the beneficial effects mentioned above.

It should be understood that the above description is only for illustrative embodiments of this application and is not intended to limit the patent scope of this application. All equivalent structures or equivalent flow transformations based on the contents in the specification and the accompanying drawings, such as combinations of technical characteristics of these illustrative embodiments, or direct or indirect applications to other relevant technical fields, should also fall within the patent protection scope of this application.

What is claimed is:

1. A flexible display device, wherein the flexible display device comprises a flexible display screen, a controller, motors respectively disposed on two sides of the flexible display screen, a backboard carrying the flexible display screen, and force sensors respectively disposed on the two sides of the flexible display screen, wherein the motors and the force sensors are connected with the controller, the force sensors are rigidly connected with a peripheral frame of the flexible display screen, and the motors are provided with stretchy screw rods rigidly connected with the flexible display screen;

the backboard comprises a first board body and a second board body, the first board body has an end provided with first extension parts extending towards the second board body, the second board body has an end provided with second extension parts extending towards the first board body, and the first extension parts and the second extension parts are sequentially and alternately disposed; when the flexible display screen is in a planar state, an orthographic projection of a folding area of the flexible display screen is located in areas of the first extension parts and the second extension parts; and when the flexible display screen is in the planar state, a transverse distance between the first board body and the second board body is greater than or equal to a deformation of the folding area of the flexible display screen, wherein the force sensors obtain tension transmitted by the flexible display screen when the flexible display screen is switched between the planar state and a folded state, the controller figures out a transverse displacement of the flexible display screen according to the tension, and controls the motors to drive the flexible display screen to generate a displacement which is opposite to the transverse displacement in direction and identical with the transverse displacement in distance.

2. The flexible display device according to claim 1, wherein sliding mechanisms are disposed on a side, towards the flexible display screen, of the backboard, and the flexible display screen is carried by the sliding mechanisms and is capable of moving relative to the backboard through the sliding mechanisms.

3. The flexible display device according to claim 1, wherein the flexible display device further comprises a rear shell located on an outer side of the backboard, the flexible display screen is rigidly connected with the backboard, sliding mechanisms are disposed on a side, backing onto the flexible display screen, of the backboard, and the backboard is capable of moving relative to the rear shell through the sliding mechanisms.

4. A flexible display device, wherein the flexible display device comprises a flexible display screen, a controller, motors respectively disposed on two sides of the flexible display screen, and force sensors respectively disposed on the two sides of the flexible display screen, wherein the motors and the force sensors are connected with the controller, the force sensors are rigidly connected with the flexible display screen, and the motors are provided with stretchy screw rods rigidly connected with the flexible display screen, wherein the force sensors obtain tension transmitted by the flexible display screen when the flexible display screen is switched between a planar state and a folded state, the controller figures out a transverse displacement of the flexible display screen according to the tension, and controls the motors to drive the flexible display screen to generate a displacement which is opposite to the transverse displacement in direction and identical with the transverse displacement in distance.

5. The flexible display device according to claim 4, wherein the flexible display device further comprises a backboard used for carrying the flexible display screen, wherein the backboard comprises a first board body and a second board body, the first board body has an end provided with first extension parts extending towards the second board body, the second board body has an end provided with second extension parts extending towards the first board body, and the first extension parts and the second extension parts are sequentially and alternately disposed; and when the flexible display screen is in a planar state, an orthographic projection of a folding area of the flexible display screen is located in areas of the first extension parts and the second extension parts.

6. The flexible display device according to claim 5, wherein sliding mechanisms are disposed on a side, towards the flexible display screen, of the backboard, and the flexible display screen is carried by the sliding mechanisms and is capable of moving relative to the backboard through the sliding mechanisms.

7. The flexible display device according to claim 5, wherein the flexible display device further comprises a rear shell located on an outer side of the backboard, the flexible display screen is rigidly connected with the backboard, sliding mechanisms are disposed on a side, backing onto the flexible display screen, of the backboard, and the backboard is capable of moving relative to the rear shell through the sliding mechanisms.

8. The flexible display device according to claim 4, wherein the force sensors are rigidly connected with a peripheral frame of the flexible display screen.

9. The flexible display device according to claim 4, wherein when the flexible display screen is in a planar state, a transverse distance between the first board body and the second board body is greater than or equal to a deformation of a folding area of the flexible display screen.

10. A deformation compensation method of a flexible display screen, wherein the method comprises:
respectively connecting force sensors to two sides of a flexible display screen, and respectively connecting motors to the two sides of the flexible display screen, wherein the motors are provided with stretchy screw rods rigidly connected with the flexible display screen;
connecting the force sensors and the motors to a controller; and
obtaining, by the force sensors, tension transmitted by the flexible display screen when the flexible display screen is switched between a planar state and a folded state, figuring out, by the controller, a transverse displacement of the flexible display screen according to the tension, and controlling the motors to drive the flexible display screen to generate a displacement which is opposite to the transverse displacement in direction and identical with the transverse displacement in distance.

11. The method according to claim 10, wherein when the flexible display screen in the planar state is switched to the folded state, the force sensors obtain a pushing force transmitted by the flexible display screen, and the controller controls the motors to increase an extension length of the screw rods.

12. The method according to claim 10, wherein when the flexible display screen in the folded state is switched to the planar state, the force sensors obtain a pulling force transmitted by the flexible display screen, and the controller controls the motors to decrease the extension length of the screw rods.

13. The method according to claim 10, wherein the method further comprises:
disposing a backboard used for carrying the flexible display screen on a back side of the flexible display screen, wherein the backboard comprises a first board body and a second board body, the first board body has an end provided with first extension parts extending towards the second board body, the second board body has an end provided with second extension parts extending towards the first board body, the first extension parts and the second extension parts are sequentially and alternately disposed, and when the flexible display screen is in the planar state, an orthographic projection of a folding area of the flexible display screen is located in areas of the first extension parts and the second extension parts;
when the flexible display screen in the planar state is switched to the folded state, the first extension parts and the second extension parts are tangent to the folding area so as to support the folding area;
when the flexible display screen in the folded state is switched to the planar state, the first extension parts and the second extension parts draw close to the folding area so as to support the folding area.

14. The method according to claim 13, wherein sliding mechanisms are disposed on a side, towards the flexible display screen, of the backboard, and the flexible display screen is carried by the sliding mechanisms; and
when the flexible display screen is switched between the planar state and the folded state, the motors drive the flexible display screen to generate a displacement, relative to the backboard, which is opposite to the transverse displacement in direction and identical with the transverse displacement in distance.

15. The method according to claim 12, wherein the backboard is rigidly connected with the flexible display screen, and sliding mechanisms are disposed on a side, backing onto the flexible display screen, of the backboard;
the method further comprises the step: disposing a rear shell used for carrying the backboard on a back side of the backboard, wherein,
when the flexible display screen is switched between the planar state and the folded state, the motors drive the flexible display screen to generate a displacement, relative to the rear shell, which is opposite to the transverse displacement in direction and identical with the transverse displacement in distance.

16. The method according to claim 10, wherein the force sensors are rigidly connected with a peripheral frame of the flexible display screen.

17. The method according to claim 10, wherein when the flexible display screen is in the planar state, a transverse distance between the first board body and the second board body is greater than or equal to a deformation of a folding area of the flexible display screen.

\* \* \* \* \*